(12) United States Patent
Benton et al.

(10) Patent No.: US 10,500,544 B2
(45) Date of Patent: Dec. 10, 2019

(54) ADVANCEMENTS IN OSMOTICALLY DRIVEN MEMBRANE SYSTEMS INCLUDING MULTI-STAGE PURIFICATION

(71) Applicant: Porifera, Inc., Hayward, CA (US)

(72) Inventors: Charles Benton, Berkeley, CA (US); Olgica Bakajin, San Leandro, CA (US); Carl Lundin, Honolulu, HI (US)

(73) Assignee: Porifera, Inc., San Leandro, CA (US)

(*) Notice: Subject to any disclaimer, the term of this patent is extended or adjusted under 35 U.S.C. 154(b) by 556 days.

(21) Appl. No.: 14/777,418

(22) PCT Filed: Mar. 14, 2014

(86) PCT No.: PCT/US2014/029332
§ 371 (c)(1),
(2) Date: Sep. 15, 2015

(87) PCT Pub. No.: WO2014/144778
PCT Pub. Date: Sep. 18, 2014

(65) Prior Publication Data
US 2016/0002074 A1    Jan. 7, 2016

Related U.S. Application Data

(60) Provisional application No. 61/794,537, filed on Mar. 15, 2013.

(51) Int. Cl.
*B01D 61/58* (2006.01)
*B01D 61/12* (2006.01)
(Continued)

(52) U.S. Cl.
CPC ........... *B01D 61/58* (2013.01); *B01D 61/002* (2013.01); *B01D 61/02* (2013.01); *B01D 61/022* (2013.01);
(Continued)

(58) Field of Classification Search
CPC ...... B01D 61/58; B01D 61/027; B01D 61/02; B01D 65/02; B01D 61/025; B01D 61/06;
(Continued)

(56) References Cited

U.S. PATENT DOCUMENTS

| 3,352,422 A | 11/1967 | Heden |
| 3,721,621 A | 3/1973 | Hough |

(Continued)

FOREIGN PATENT DOCUMENTS

| CA | 2785807 A1 | 7/2011 |
| CN | 101228214 A | 7/2008 |

(Continued)

OTHER PUBLICATIONS

Chen et al., Influences of molecular weight, molecular size, flux, and recovery for aromatic pesticide removal by nanofiltration membrnanes, 2004, Desalination 160, pp. 103-111. (Year: 2004).*

(Continued)

*Primary Examiner* — David C Mellon
(74) *Attorney, Agent, or Firm* — Dorsey & Whitney LLP (57) ABSTRACT

An example water purification system for purifying high concentration feed solutions includes a high rejection forward osmosis module, one or more low rejection modules, and a high rejection reverse osmosis module. The low rejection modules may have different rejection levels. The system may be pressurized by one or more pumps. One or more of the low rejection modules may include one or more nanofiltration (NF) membranes. The draw solution may comprise a monovalent salt, a multivalent salt, or a combination of both.

16 Claims, 3 Drawing Sheets

(51) Int. Cl.
  *B01D 61/00* (2006.01)
  *B01D 61/02* (2006.01)
  *B01D 61/06* (2006.01)
  *B01D 65/02* (2006.01)
  *C02F 1/44* (2006.01)

(52) U.S. Cl.
  CPC ......... B01D 61/025 (2013.01); B01D 61/027 (2013.01); B01D 61/06 (2013.01); B01D 61/12 (2013.01); B01D 65/02 (2013.01); C02F 1/441 (2013.01); C02F 1/445 (2013.01); *B01D 2311/14* (2013.01); *B01D 2311/25* (2013.01); *B01D 2313/243* (2013.01); *B01D 2313/246* (2013.01); *B01D 2317/02* (2013.01); *B01D 2317/025* (2013.01); *B01D 2317/08* (2013.01); *B01D 2321/16* (2013.01); *B01D 2325/20* (2013.01)

(58) Field of Classification Search
  CPC ............... B01D 61/12; B01D 2317/08; B01D 2325/20; B01D 2317/025; B01D 2317/02; B01D 2311/25; B01D 2313/243; B01D 2313/246; B01D 61/022; B01D 61/002; B01D 2311/14; B01D 2321/16; C02F 1/445; C02F 1/441
  See application file for complete search history.

(56) References Cited

U.S. PATENT DOCUMENTS

| | | |
|---|---|---|
| 4,326,509 A | 4/1982 | Usukura |
| 4,428,720 A | 1/1984 | Van Erden et al. |
| 4,454,176 A | 6/1984 | Buckfelder et al. |
| 4,618,533 A | 10/1986 | Steuck |
| 4,756,835 A | 7/1988 | Wilson |
| 4,792,402 A | 12/1988 | Fricker |
| 4,900,443 A | 2/1990 | Wrasidlo |
| 5,084,220 A | 1/1992 | Moller |
| 5,100,556 A | 3/1992 | Nichols |
| 5,192,434 A | 3/1993 | Moller |
| 5,238,574 A * | 8/1993 | Kawashima ......... B01D 61/022 210/652 |
| 5,593,738 A | 1/1997 | Ihm et al. |
| 6,261,879 B1 | 7/2001 | Houston et al. |
| 6,406,626 B1 | 6/2002 | Murakami et al. |
| 6,413,070 B1 | 7/2002 | Meyering et al. |
| 6,513,666 B2 | 2/2003 | Meyering et al. |
| 6,755,970 B1 | 6/2004 | Knappe et al. |
| 6,849,184 B1 | 2/2005 | Lampi et al. |
| 6,884,375 B2 | 4/2005 | Wang et al. |
| 6,992,051 B2 | 1/2006 | Anderson |
| 7,177,978 B2 | 2/2007 | Kanekar et al. |
| 7,205,069 B2 | 4/2007 | Smalley et al. |
| 7,445,712 B2 | 11/2008 | Herron |
| 7,611,628 B1 | 11/2009 | Hinds, III |
| 7,627,938 B2 | 12/2009 | Kim et al. |
| 7,799,221 B1 | 9/2010 | MacHarg |
| 7,879,243 B2 | 2/2011 | Al-Mayahi et al. |
| 7,901,578 B2 | 3/2011 | Pruet |
| 7,955,506 B2 | 6/2011 | Bryan et al. |
| 8,029,671 B2 | 10/2011 | Cath et al. |
| 8,029,857 B2 | 10/2011 | Hoek et al. |
| 8,038,887 B2 | 10/2011 | Bakajin et al. |
| 8,083,942 B2 | 12/2011 | Cath et al. |
| 8,177,978 B2 | 5/2012 | Kurth et al. |
| 8,181,794 B2 | 5/2012 | McGinnis et al. |
| 8,221,629 B2 | 7/2012 | Al-Mayahi et al. |
| 8,246,791 B2 | 8/2012 | McGinnis et al. |
| 8,252,350 B1 | 8/2012 | Cadwalader et al. |
| 8,356,717 B2 | 1/2013 | Waller, Jr. et al. |
| 8,518,276 B2 | 8/2013 | Stiemer et al. |
| 8,567,612 B2 | 10/2013 | Kurth et al. |
| 8,960,449 B2 | 2/2015 | Tomioka et al. |
| 9,636,635 B2 | 5/2017 | Benton et al. |
| 2002/0063093 A1 | 5/2002 | Rice et al. |
| 2002/0148769 A1 | 10/2002 | Deuschle et al. |
| 2003/0038074 A1 | 2/2003 | Patil |
| 2003/0173285 A1 | 9/2003 | Schmidt et al. |
| 2004/0004037 A1 | 1/2004 | Herron |
| 2004/0071951 A1 | 4/2004 | Jin |
| 2005/0142385 A1 | 6/2005 | Jin |
| 2006/0144789 A1 | 7/2006 | Cath et al. |
| 2006/0233694 A1 | 10/2006 | Sandhu et al. |
| 2007/0215544 A1 | 9/2007 | Kando et al. |
| 2008/0017578 A1 | 1/2008 | Childs et al. |
| 2008/0149561 A1 | 6/2008 | Chu et al. |
| 2008/0210370 A1 | 9/2008 | Smalley et al. |
| 2008/0223795 A1 | 9/2008 | Bakajin et al. |
| 2008/0236804 A1 | 10/2008 | Cola et al. |
| 2008/0237126 A1 | 10/2008 | Hoek et al. |
| 2008/0290020 A1 | 11/2008 | Marand et al. |
| 2009/0078640 A1 | 3/2009 | Chu et al. |
| 2009/0214847 A1 | 8/2009 | Maruyama et al. |
| 2009/0250392 A1 | 10/2009 | Thorsen et al. |
| 2009/0272692 A1 | 11/2009 | Kurth et al. |
| 2009/0283475 A1 | 11/2009 | Hylton et al. |
| 2009/0308727 A1 | 12/2009 | Kirts |
| 2009/0321355 A1 | 12/2009 | Ratto et al. |
| 2010/0025330 A1 | 2/2010 | Ratto et al. |
| 2010/0032377 A1 | 2/2010 | Wohlert |
| 2010/0051538 A1 | 3/2010 | Freeman et al. |
| 2010/0059433 A1 | 3/2010 | Freeman et al. |
| 2010/0062156 A1 | 3/2010 | Kurth et al. |
| 2010/0140162 A1 | 6/2010 | Jangbarwala |
| 2010/0155333 A1 | 6/2010 | Husain et al. |
| 2010/0192575 A1* | 8/2010 | Al-Mayahi ......... B01D 61/002 60/671 |
| 2010/0206743 A1 | 8/2010 | Sharif et al. |
| 2010/0206811 A1 | 8/2010 | Ng et al. |
| 2010/0212319 A1 | 8/2010 | Donovan |
| 2010/0224550 A1 | 9/2010 | Herron |
| 2010/0224561 A1 | 9/2010 | Marcin |
| 2010/0320140 A1 | 12/2010 | Nowak et al. |
| 2010/0326833 A1 | 12/2010 | Messalem et al. |
| 2011/0017666 A1 | 1/2011 | Cath et al. |
| 2011/0036774 A1 | 2/2011 | McGinnis |
| 2011/0057322 A1 | 3/2011 | Matsunaga et al. |
| 2011/0073540 A1 | 3/2011 | McGinnis et al. |
| 2011/0132834 A1 | 6/2011 | Tomioka et al. |
| 2011/0155666 A1* | 6/2011 | Prakash ................ B01D 61/04 210/641 |
| 2011/0186506 A1 | 8/2011 | Ratto et al. |
| 2011/0220574 A1 | 9/2011 | Bakajin et al. |
| 2011/0284456 A1 | 11/2011 | Brozell et al. |
| 2012/0043274 A1 | 2/2012 | Chi et al. |
| 2012/0080378 A1 | 4/2012 | Revanur et al. |
| 2012/0080381 A1 | 4/2012 | Wang et al. |
| 2012/0103892 A1 | 5/2012 | Beauchamp et al. |
| 2012/0118743 A1 | 5/2012 | Liang et al. |
| 2012/0118826 A1 | 5/2012 | Liberman et al. |
| 2012/0118827 A1 | 5/2012 | Chang et al. |
| 2012/0132595 A1 | 5/2012 | Bornia |
| 2012/0160753 A1 | 6/2012 | Vora et al. |
| 2012/0231535 A1 | 9/2012 | Herron et al. |
| 2012/0234758 A1 | 9/2012 | McGinnis et al. |
| 2012/0241371 A1 | 9/2012 | Revanur et al. |
| 2012/0241373 A1 | 9/2012 | Na et al. |
| 2012/0251521 A1 | 10/2012 | Rostro et al. |
| 2012/0261321 A1 | 10/2012 | Han et al. |
| 2012/0267297 A1 | 10/2012 | Iyer |
| 2012/0267306 A1 | 10/2012 | McGinnis et al. |
| 2012/0273421 A1 | 11/2012 | Perry et al. |
| 2013/0001162 A1 | 1/2013 | Yangali-Quintanilla et al. |
| 2013/0095241 A1 | 4/2013 | Lulevich et al. |
| 2013/0105383 A1 | 5/2013 | Tang et al. |
| 2013/0203873 A1 | 8/2013 | Linder et al. |
| 2013/0220581 A1 | 8/2013 | Herron et al. |
| 2014/0015159 A1 | 1/2014 | Lazar et al. |
| 2014/0175011 A1 | 6/2014 | Benton et al. |
| 2014/0302579 A1 | 10/2014 | Boulanger et al. |
| 2014/0319056 A1 | 10/2014 | Fuchigami et al. |
| 2015/0014232 A1 | 1/2015 | McGinnis et al. |

(56) References Cited

U.S. PATENT DOCUMENTS

| | | | |
|---|---|---|---|
| 2015/0014248 A1* | 1/2015 | Herron | B01D 61/58 210/641 |
| 2015/0064306 A1 | 3/2015 | Tatera et al. | |
| 2015/0273399 A1 | 10/2015 | Roh et al. | |
| 2016/0136577 A1 | 5/2016 | McGovern et al. | |
| 2016/0136578 A1 | 5/2016 | McGovern et al. | |
| 2016/0136579 A1 | 5/2016 | McGovern et al. | |
| 2016/0230133 A1 | 8/2016 | Peterson et al. | |
| 2017/0197181 A1 | 7/2017 | Benton et al. | |

FOREIGN PATENT DOCUMENTS

| | | |
|---|---|---|
| FR | 2189091 A1 | 1/1974 |
| JP | S55149682 A | 11/1980 |
| JP | 59059213 A | 4/1984 |
| JP | S5959213 A | 4/1984 |
| JP | 62-140620 A | 6/1987 |
| JP | 2005-138028 A | 6/2005 |
| JP | 2010094641 A | 4/2010 |
| JP | 2012183492 A | 9/2012 |
| KR | 101229482 B1 | 2/2013 |
| WO | 1993/010889 | 6/1993 |
| WO | 9962623 | 12/1999 |
| WO | 0213955 A1 | 2/2002 |
| WO | 2006040175 A1 | 4/2006 |
| WO | 2008/137082 A1 | 11/2008 |
| WO | 2009/035415 | 3/2009 |
| WO | 2009039467 A1 | 3/2009 |
| WO | 2009129354 A2 | 10/2009 |
| WO | 2010006196 A2 | 1/2010 |
| WO | 2010050421 A1 | 5/2010 |
| WO | 2010067063 A1 | 6/2010 |
| WO | 2010144057 A1 | 12/2010 |
| WO | 2011028541 A1 | 3/2011 |
| WO | 2012/047282 | 4/2012 |
| WO | 2012/084960 | 6/2012 |
| WO | 2012095506 A1 | 7/2012 |
| WO | 2012102677 A1 | 8/2012 |
| WO | 2012/135065 | 10/2012 |
| WO | 2013/022945 A2 | 2/2013 |
| WO | 2013/059314 | 4/2013 |
| WO | 2014/071238 A1 | 5/2014 |
| WO | 2014100766 A2 | 6/2014 |
| WO | 2014144704 A1 | 9/2014 |
| WO | 2014144778 A1 | 9/2014 |
| WO | 2016210337 A2 | 12/2016 |

OTHER PUBLICATIONS

Third OA for CN Application No. 201480022732.9, dated Jun. 29, 2017.
Fourth OA for CN Application No. 201480022732.9, dated Dec. 28, 2017.
U.S. Appl. No. 15/739,657, Methods of Dewatering of Alcoholic Solutions Via Forward Osmosis and Related Systems, filed Dec. 22, 2017.
Extended European Seatch Report received for EP Appl. No. 14764413.2 dated Jan. 2, 2017.
Second Office Action for PRC (China) Pat. Appln. No. 201480022732.9 dated Jan. 16, 2017.
U.S. Appl. No. 15/470,757, entitled "Separation Systems, Elements, and Methods for Separation Utilizing Stacked Membranes and Spacers", filed Mar. 27, 2017.
Examination Report No. 1 dated May 15, 2017 for Australian application No. 2014228787, 4 pages.
First Office Action for PRC (China) Appl. No. 201480022732.9 dated Jul. 5, 2016.
International Search Report and Written Opinion for app. No. PCT/US2014/029332 dated Jul. 3, 2014.
Akthakul, et al., "Antifouling polymer membranes with subnanometer size selectivity", Macromolecules 37, Sep. 3, 2004, 7663-7668.
Cath, et al., "Forward osmosis: principles, applications and recent developments", Journal of Membrane Science 281, May 31, 2006, 70-87.
Li, et al., "Electronic properties of multiwalled carbon nanotubes in an embedded vertical array", Applied Physics Letters vol. 81, No. 5, 2002, 910-912.
Mandal, et al., "Drug delivery system based on chronobiology—a review", Journal of Controlled Release 147, Aug. 4, 2010, 314-325.
McCutcheon, et al., "Influence of membrane support layer hydrophobicity on water flux in osmotically driven membrane processes", Journal of Membrane Science, Mar. 2008, 458-466.
McEuen, P. et al., "Single-Walled Nanotubes Electronics", IEEE Transactions on Nanotechnology, Vo.1, No. 1, Mar. 2002.
Santus, et al., "Osmotic drug delivery: a review of the patent literature", Journal of Controlled Release 35, Jul. 1995, 1-21.
Sotthivirat, et al., "Controlled porosity-osmotic pump pellets of a poorly water-soluble drug using sulfobutylether-b-cyclodestrin, (SBE)_7M-b-CD, as a solubilizing and osmotic agent", Journal of Pharmaceutical Sciences vol. 96, No. 9, Sep. 2007, 2364-2374.
Yip, Nagai Y. et al., "High Performance Thin-Film Composite Forward Osmosis Membrane", Environmental Science & Technology, vol. 44, No. 10, 2010, Apr. 21, 2010, 3812-3818.
Zhao, et al., "Modification of porous poly (vinylidene fluoride) membrane using amphiphilic polymers with different structures in phase inversion process", Journal of Membrane Science 310, Mar. 2008, 567-576.
Extended European Search Report received for EP Appl. No. 14764413.2 dated Feb. 8, 2017.
Examination Report No. 2 dated Apr. 6, 2018 for Australian application No. 2014228787, 3 pages.
English Translation of Final Rejection for CN Application No. 201480022732.9 dated Jun. 26, 2018.

* cited by examiner

ADVANCEMENTS IN OSMOTICALLY DRIVEN MEMBRANE SYSTEMS INCLUDING MULTI-STAGE PURIFICATION

RELATED APPLICATIONS

This application is a 371 National Stage application claiming priority to PCT Application No. PCT/US2014/029332 filed Mar. 14, 2014, which application claims the benefit of the earlier filing date of U.S. Provisional Application No. 61/794,537 filed Mar. 15, 2013, which applications are incorporated herein by reference, in their entirety, for any purpose.

GOVERNMENT SPONSORSHIP

This invention was made with Government support under contract number W911NF-09-C-0079 awarded by the Department of Defense. The Government has certain rights in this invention.

TECHNICAL FIELD

Examples described herein relate to separation systems, elements, and methods which may be used for forward osmosis (FO) or reverse osmosis (RO), or generally any separation process.

BACKGROUND

For osmotic pre-treatment, higher draw solution osmotic potential substantially increases the system's operating window of feed concentration. Conventional systems typically have a limit on draw solution concentration for reverse osmosis (RO).

In RO systems, the maximum feed salinity treatable is limited by the maximum salinity of the draw solution. The draw solution is typically limited to a high point of 80,000 ppm, as any greater concentration would require a RO hydrostatic pressure that would rupture the membrane. Maximum RO operation hydrostatic pressure is typically between 1000 and 1200 psi. The following generally explains this limitation. The flux across the RO membrane is proportional to the active membrane pressure. The active membrane pressure is the difference in hydrostatic pressure across the RO membrane (typically 800 psi feed to near atmosphere permeate) less the difference in osmotic pressure across the RO membrane (typically 500 psi feed to near 0 psi permeate). The active membrane pressure may be adjusted by changing any of the aforementioned values. While the osmotic pressure of the feed is easily adjustable in the system, the osmotic pressure of the permeate is typically fixed near zero, and is a function of the rejection of the RO membrane (defined as one minus the fraction of salt that passes into the permeate, typical RO rejections are greater than 99%).

Consequently, purification systems that are capable of treating feed solutions in excess concentrations of 80,000 ppm typically use heat and phase change, resulting in large foot prints, high energy demands and high capital system costs compared to membrane driven systems. These systems are used when the feed total dissolved solute (TDS) is greater than 80,000 ppm, or when lower TDS feed solutions must be treated to high recoveries with rejects exceeding 80,000 ppm (e.g., zero liquid discharge applications).

SUMMARY

Examples of apparatuses, systems, and methods for purification are disclosed herein. For example, an apparatus may include a forward osmosis module which may receive a feed stream and a high concentration draw stream to produce a first stream; a pump which may pressurize the first stream; a low rejection membrane module which may receive the pressurized first stream to produce the high concentration draw stream and a low concentration stream; and a reverse osmosis module which may receive the low concentration stream to produce a product stream and a reject stream. The reject stream from the reverse osmosis stream may be combined with the first stream and provided to the low rejection module. The draw stream may include a multivalent salt.

An example system may include a forward osmosis stage which may be configured to receive a draw stream and a feed stream to produce a first stream; a plurality of low rejection stages connected in series which may be configured to receive the first stream and produce an output stream; and a reverse osmosis stage which may receive the output stream to produce a reject stream and a product stream. The low rejection stages may each produce a reject stream and provide the reject stream to the previous low rejection stage.

A further example, a method may include providing a draw stream to a forward osmosis module; providing a feed stream to the forward osmosis module; filtering the feed stream with the forward osmosis module which may produce a first stream; pressurizing the first stream; filtering the pressurized first stream with a low rejection module which may produce a dilute stream; and filtering the dilute stream with a reverse osmosis module which may produce a product stream. The method may further include adding anti-scalants or anti-foulants to the feed stream.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known chemical structures, chemical components, molecules, materials, manufacturing components, control systems, electronic components, timing protocols, and software operations have not been shown in detail in order to avoid unnecessarily obscuring the described embodiments of the invention.

In examples described herein, existing limits on draw solution concentration for reverse osmosis (RO) and high pressure RO may be overcome using nanofiltration (NF) and/or RO membrane modules staged in an array of two or more modules deep, and allowing increased salt concentrations on the permeate side of the NF or RO membrane in upstream stages. In this way, the effective concentration differential across each RO membrane is reduced along with the required applied hydraulic pressure. The increased salt concentration on the permeate side of the RO membrane can be produced in several ways, including utilizing less selective RO membranes or a style of RO membrane with 4 ports (e.g., draw in/out, permeate in/out). This staging of RO modules is typically not done because of the multiplicative nature of recoveries, meaning that total system recovery may be very low. Advantages of examples described herein and any described disadvantages of conventional systems are not intended to be limiting, and are provided to aid in understanding. It should be understood that some examples may not exhibit all, or even any, of the described advantages. Moreover, some examples may not address all, or even any, of the described disadvantages of conventional systems.

By pairing multiple reverse osmosis (RO) vessels with a forward osmosis pre-treatment, the overall system recovery in some examples may be decoupled from the RO system recovery. Coupling of forward osmosis (FO) pre-treatment with multi-stage NF and/or RO allows for increase of overall system water recovery in some examples compared to what the recovery would be if FO pre-treatment system was not used.

Figure 1:
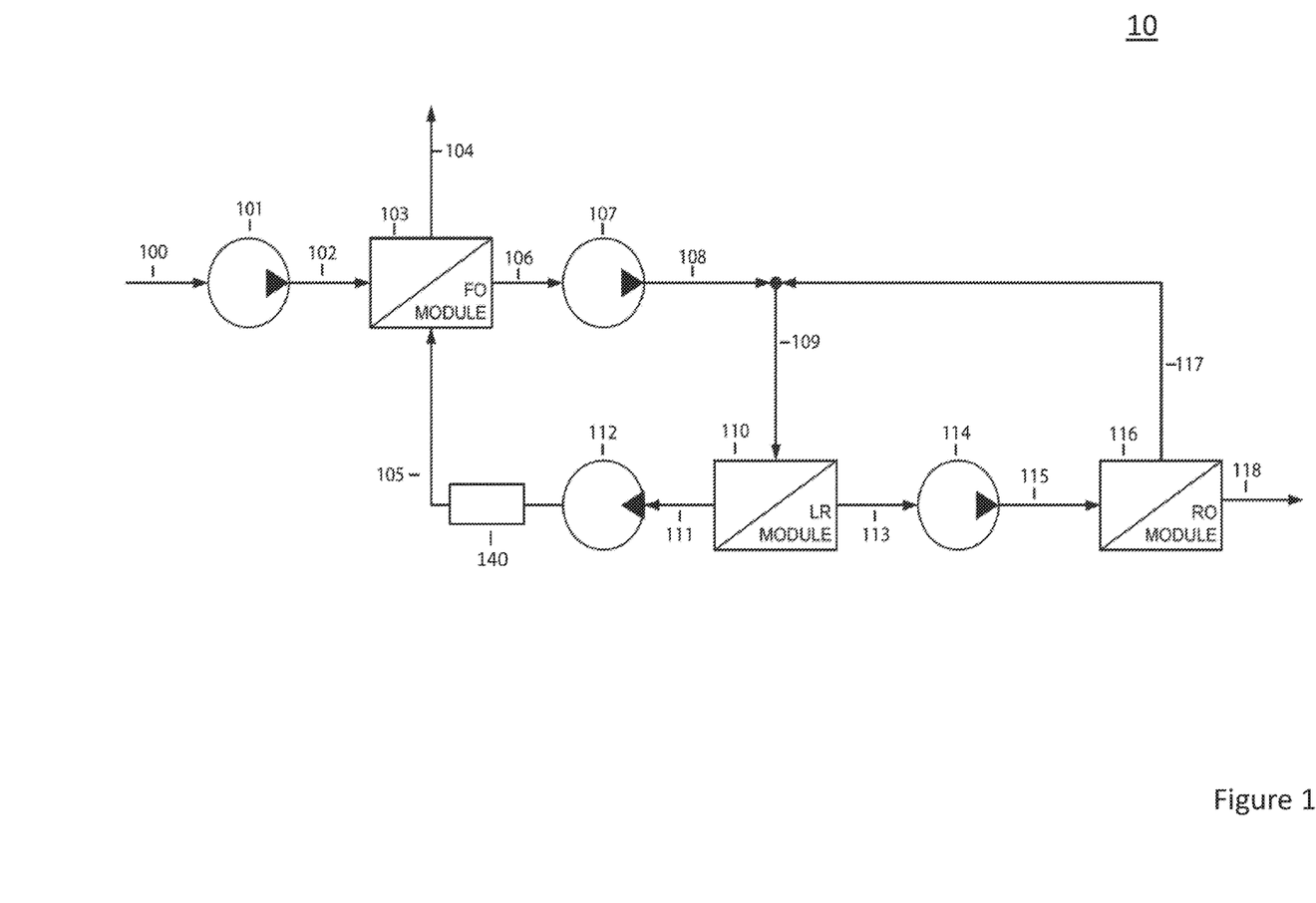
FIG. 1 is a block diagram of a purification system according to an embodiment of the invention.

An example purification system 10 according to an embodiment of the invention is illustrated in the block diagram of FIG. 1. The system 10 may be capable of treating feed solutions 100 in excess of 80,000 ppm concentration by regenerating a draw solution 105 at a concentration higher than the feed 100. While a hydrostatic pressure exceeding 1200 psi may be required in some examples to re-concentrate this draw solution with an array of RO membranes in one stage, by breaking up the re-concentration into two or more stages, each stage may operate at a hydrostatic pressure below the burst pressure of the membrane. High pressure RO elements are generally rated 1800 psi, but may be run up to 3000 psi when fouling and scaling may be mitigated.

Separating the re-concentration into multiple stages may in some examples use an intermediate pressure driven, salt rejecting membrane or membranes. While the difference in hydrostatic pressure or osmotic pressure across these membranes may not be increased with respect to the limits of a conventional RO membrane, the feed osmotic pressure may be increased by also increasing the permeate osmotic pressure, which may keep the difference in osmotic pressure between the two streams constant. A membrane with a reduced salt rejection with respect to conventional RO membranes, such as an NR membrane or loosened RO membrane, may be used.

Returning to FIG. 1, the system 10 illustrates a two-stage FO/RO system which may be capable of treating high concentration feeds to concentrations less than 120 kppm. The system may use a sodium chloride draw solute, but may be utilized with other draw solutes, in single form or in combination. The system includes three membrane arrays; an FO module 103, a low rejection pressure driven salt rejecting module 110 (LR), and an RO module 116. The FO module 103 generally includes an array of FO membranes, arranged in parallel, series, or a combination of both. Any suitable FO membrane may generally be used. The FO module 103 may generally have a high salt rejection (e.g. typically greater than 95%). The LR module 110 generally includes an array of membranes having a salt rejection less than RO (which is, for example, typically 99% or greater). The array of membranes in the LR module may be arranged in series, parallel, or a combination thereof. Generally, the module may have salt rejection (e.g. sodium chloride rejection) of less than 90%, less than 80% in some examples, less than 70% in some examples, less than 60% in some examples, less than 50% in some examples. The RO module 116 generally includes an array of RO membranes, arranged in parallel, series, or a combination of both. Any suitable RO membrane may generally be used. The RO module may have high rejection (e.g. typically greater than 99%).

During example operation, a high concentration feed stream 102, enters the FO module 103, where it is dewatered and leaves the system as reject stream 104. Generally, any stream may be used as the feed stream, including but not limited to, seawater or wastewater. A high concentration draw stream 105 (e.g., 120 kppm) flows (e.g., 1 MGD) with a pressure which may be near atmospheric enters the FO module 103, absorbing mass and becoming diluted, exiting as a first stream 106 of a reduced concentration (e.g., 80 kppm) and flows (e.g., 1.5 MGD) with a pressure which may be near atmospheric. This stream may be too high in concentration to recover with a single stage RO. The stream may then be pressurized (e.g., 1000 psi) by a pump 107, which may be a high pressure pump, then combined with an adjacent reverse osmosis reject (e.g. brine) stream 117 (which may be a high pressure stream) with a flow rate (e.g., 0.5 MGD), forming stream 109 with a flow rate (e.g., 2 MGD). The pressure may remain elevated (e.g., 1000 psi). The stream 109 may be contacted with a low rejection pressure driven salt rejecting module 110 (LR), which may have a rejection of, e.g., 50% and a recovery rate of 50%. In other examples, the salt rejection (e.g. sodium chloride rejection) of the module 110 may be less than 40%, less than 50%, less than 60%, less than 70%, less than 80%, or less than 90% in some examples. In other examples, the recovery rate of the module 110 may be less than 90%, less than 70%, less than 50%, less than 30% and greater than 10% In contrast to RO membranes where, for example, a 50% recovery results in a reject stream that is approximately twice the concentration of the feed stream limiting the recovery at high TDS, LR membranes will have a concentration less than twice the feed stream due to bulk salt transfer across the membrane, allowing for higher recovery ratios than typical RO membranes. The hydrostatic pressure of stream 109 may overcome the average difference in concentration across the membrane (e.g., 40 kppm by 300 psi), generating a low concentration stream 113 (e.g., 40 kppm) that flows (e.g., 1 MGD), and which may have a pressure near atmospheric, and a high concentration draw stream 111 (e.g. 120 kppm) which may flow (e.g., 1 MGD) and have a higher pressure (e.g., 1000 psi).

The pressure of this stream may be decreased across an energy recovery device 112 (e.g. hydraulic motor), forming a low pressure high concentration draw stream 105 that may be fed to the FO membrane array 103. A dosing pump 140 may be configured to provide a solute to the high concentration draw stream 105. The low concentration stream 113 may then be pressurized to a higher pressure (e.g., 1000 psi) by a pump 114, forming stream 115. This stream is fed to the stage 2 RO module 116 which may have a high rejection (e.g. greater than 99%, greater than 98%, greater than 97%, greater than 95%, or greater than 90% in some examples). The hydrostatic pressure may overcome the average difference in concentration across the membrane (e.g., 40 kppm by 300 psi) and may generate a high quality product stream 118.

The product stream 118 may have a concentration of nearly 0 kppm (e.g., 350 ppm), flow of 0.5 MGD and pressure near atmospheric. The RO module 116 may also produce a reverse osmosis reject stream 117 which may be combined with stream 108 and recycled as discussed above. The reverse osmosis reject stream 117 may have a concentration of 80 kppm, flow of 0.5 MGD and pressure of 1000 psi.

A nanofiltration (NF) membrane may be used as an intermediate stage 1 pressure driven salt rejecting membrane array, in module 110. Unlike RO membranes which tend to reject multivalent salts at a high percentage than monovalent salts, the NF membrane may reject monovalent salts at a higher percentage than multivalent salts. This may be leveraged by having a draw solute that includes both monovalent salts (e.g. sodium chloride or lithium chloride) and multivalent salts (e.g. magnesium chloride, calcium chloride, magnesium sulfate, or sodium phosphate). For example, a NF membrane may reject monovalent salts at 70% and multivalent salts at 30%, although other rejection percentages may be used in other examples. When entering the module 110, the multivalent salt may be more likely to leave the module in the low concentration stream 113, and the monovalent in the high concentration draw stream 111.

Consequently, the stage 2 RO module 116 may be desalting stream 115 whose salts are predominately multivalent salts, which may result in a higher quality, lower TDS product stream 118. In another example, the NF membrane may reject multivalent salts better than monovalent salts, which may result in higher specific RO flux. In other examples, the FO module 103 may receive a draw solution stream 105 whose salts are predominately monovalent salts, which may result in a higher specific flux than would be reached with multivalent salts.

Table 1 contains example flow rates, hydrostatic pressures, and concentrations of solute for different points in the system illustrated in FIG. 1. The values given in Table 1 are exemplary and should not be interpreted to limit the embodiments of the invention to the values given. Other values of flow rates, hydrostatic pressures, and concentrations of solute may be used in other examples.

TABLE 1

Exemplary Values for Two Stage FO/RO System 10

| | Element number in FIG. 1 | Flow (MGD) | Hydrostatic pressure (psi) | Concentration (ppm) |
|---|---|---|---|---|
| Feed | 102 | 0.63 | 5.0 | 35,000 |
| Feed Reject | 104 | 0.13 | 0.0 | 105,000 |
| FO draw reject | 106 | 1.50 | 0.5 | 80,000 |
| Pressurized FO draw reject | 108 | 1.50 | 980 | 80,000 |
| Stage 1 LR draw feed | 109 | 2.00 | 980 | 80,000 |
| Stage 1 LR draw reject | 111 | 1.00 | 965 | 120,000 |
| FO draw feed | 105 | 1.00 | 3.0 | 120,000 |
| Stage 1 LR permeate | 113 | 1.00 | 0.5 | 40,000 |
| Stage 2 RO feed | 115 | 1.00 | 1000 | 40,000 |
| Stage 2 RO reject | 117 | 0.50 | 985 | 80,000 |
| System permeate | 118 | 0.50 | 0.0 | 350 |

Figure 2:
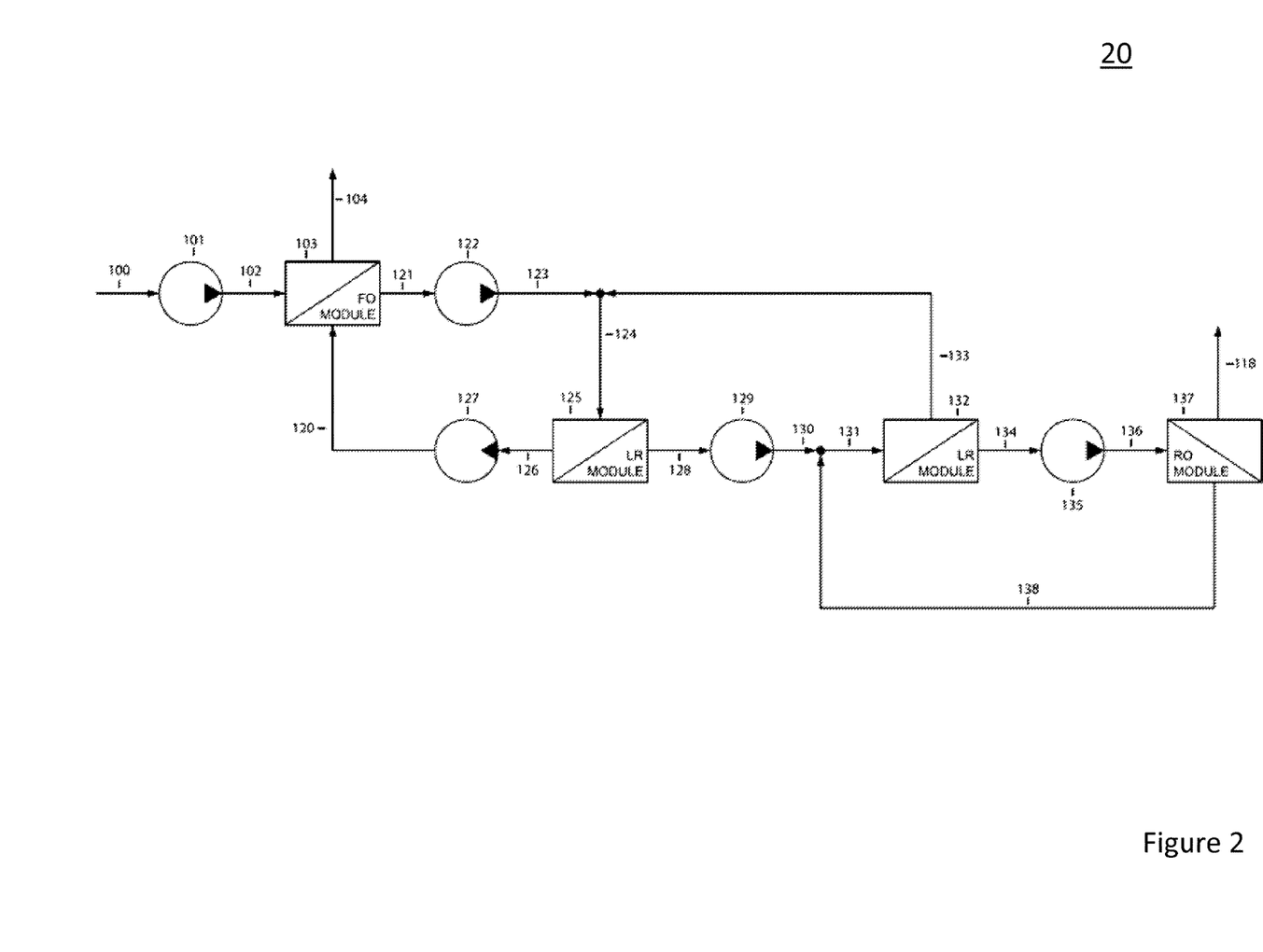
FIG. 2 is a block diagram of a purification system according to another embodiment of the invention.

FIG. 2 illustrates a block diagram of a three stage system 20 according to an embodiment of the invention. The three stage FO RO system 20 may be capable of treating high concentration feeds to concentrations less than 160 kppm. The system is considered with a sodium chloride draw solute, but may be utilized with other draw solutes, in single form or in combination with other solutes (e.g. multivalents), including sodium chloride. The system 20 may include four membrane arrays; an FO module 103 with high rejection (e.g. typically greater than 95%), an intermediate stage 1 pressure driven salt rejecting membrane array (e.g. LR module) 125 with rejection less than RO (e.g. typically 33%), an intermediate stage 2 pressure driven salt rejecting membrane array (e.g. LR module) 132 with rejection less than RO (e.g. typically 50%) and final stage 3 RO module 137 with high rejection (e.g. typically greater than 99%).

During operation, a high concentration feed stream 102, may enter the FO module 103, where is it dewatered and leaves the system as reject or waste stream 104. A high concentration draw stream 120 (e.g. 160 kppm) flows (e.g., 1.5 MGD) with a pressure which may be near atmospheric, enters the FO module 103 absorbing mass and becoming diluted, exiting as stream 121 (e.g., 120 kppm), with increase flow (e.g., 2 MGD) with a pressure which may be near atmospheric. This stream may be too high in concentration to recover with a single or double stage RO. The stream is then pressurized to a higher pressure (e.g., 1000 psi) by a pump 122, then combined with an adjacent high pressure stream 133, forming stream 124, with an increased flow (e.g., 3 MGD) but same pressure (e.g., 1000 psi). The stream 124 is contacted with LR module 125 which may have a rejection of 33%. The hydrostatic pressure (e.g. 1000 psi) may overcome the average difference in concentration across the membrane of (e.g., 60 kppm by 300 psi), generating a low concentration stream 128 (e.g., 80 kppm) with a reduced flow (e.g., 1.5 MGD), and may have a pressure near atmospheric. The LR module 125 may also produce a high concentration draw stream 126 (e.g., 160 kppm), with a reduced flow (e.g., 1.5 MGD), and higher pressure (e.g., 1000 psi).

The pressure of stream 126 may be decreased across a hydraulic motor (energy recovery device) 127, forming stream 120 that may be fed to the FO membrane array 103. The low concentration stream 128 may then be pressurized (e.g., 1000 psi) by a second pump 129, forming stream 130. This stream 130 is then combined with an adjacent high pressure stream 138, forming stream 131, with an increased flow (e.g., 2 MGD). The stream 131 is contacted with an LR module 132 which may have a rejection of 50%. The hydrostatic pressure (e.g., 1000 psi) may overcome the average difference in concentration across the membrane (e.g., 60 kppm by 300 psi), generating a dilute stream 134 (e.g., 40 kppm), with reduced flow (e.g., 1 MGD), and may have a pressure near atmospheric, and a high concentration rejection stream 133 (e.g., 120 kppm), which may have reduced flow (e.g., 1 MGD) and higher pressure (e.g., 1000 psi). This high concentration rejection stream 133 may be combined with stream 123 as described above and recycled. The dilute stream 134 may then be pressurized (e.g., 1000 psi) by a third pump 135, forming stream 136. This stream 136 is fed to the stage 3 RO module 137, which may have a rejection greater than 99%. The hydrostatic pressure (e.g., 1000 psi) may overcome the average difference in concentration across the membrane (e.g., 60 kppm by 300 psi), generating a high quality product stream 118 which may have a concentration of nearly 0 kppm, flow of 0.5 MGD and pressure near atmospheric. The RO module 137 may also produce and a reverse osmosis reject stream 138 which may have a concentration of 80 kppm, flow of 0.5 MGD and pressure of 1000 psi. This reverse osmosis reject stream 138 may be combined with stream 130 as described above and recycled.

Table 2 contains example flow rates, hydrostatic pressures, and concentrations of solute for different points in the system illustrated in FIG. 2. The values given in Table 2 are exemplary and should not be interpreted to limit the embodiments of the invention to the values given. Other values of flow rates, hydrostatic pressures, and concentrations of solute may be possible.

TABLE 2

Exemplary Values for Three Stage FO/RO System 20

| | Element number in FIG. 2 | Flow (MGD) | Hydrostatic pressure (psi) | Concentration (ppm) |
|---|---|---|---|---|
| Feed | 102 | 1.0 | 5.0 | 80,000 |
| Feed Reject | 104 | 0.55 | 0.0 | 145,000 |
| FO draw reject | 121 | 2.0 | 0.5 | 120,000 |
| Pressurized FO draw reject | 123 | 2.0 | 960 | 120,000 |
| Stage 1 LR draw feed | 124 | 3.0 | 960 | 120,000 |
| Stage 1 LR draw reject | 126 | 1.5 | 945 | 160,000 |
| FO draw feed | 120 | 1.5 | 3.0 | 160,000 |
| Stage 1 LR permeate | 128 | 1.5 | 0.5 | 80,000 |
| Pressurized stage 1 LR permeate | 130 | 1.5 | 980 | 80,000 |
| Stage 2 LR draw feed | 131 | 2.0 | 980 | 80,000 |
| Stage 2 LR draw reject | 133 | 1.0 | 965 | 120,000 |
| Stage 2 LR permeate | 134 | 1.0 | 0.5 | 40,000 |
| Stage 3 RO feed | 136 | 1.0 | 1000 | 40,000 |
| Stage 3 RO reject | 138 | 0.5 | 985 | 80,000 |
| System permeate | 118 | 0.5 | 0.0 | 350 |

While a two-stage system and a three-stage system have been shown in FIGS. 1 and 2, respectively, any number of stages may be used in other examples. Generally, example systems include a FO module whose draw stream output is provided to one, or a series of, LR modules having low rejection pressure driven salt rejecting membranes. Each LR module may produce a low concentration stream provided to a next LR module in the series, or to a later RO module, and a higher concentration stream fed back to a last stage (e.g. the FO module draw or to an earlier LR module). A subsequent RO module is provided which receives the low concentration stream from a last LR module in the series, providing a product stream.

The feed and draw water of examples described herein, including in systems 10 and 20, illustrated in FIGS. 1 and 2, may have additional pretreatment to remove increased concentrations of scalants or foulants at high recovery. Recovery is the ratio of the permeate stream (X) divided by the feed stream (Y). Scalants may include, but are not limited to: calcium carbonate, sodium carbonate, silica, gypsum, barium sulfate, strontium sulfate, and calcium fluoride. Foulants may include, but are not limited to: small organic molecules, particulates or colloids, or biological film growth. The feed and draw water may be treated with antiscalants or antifoulants to prevent scaling or fouling of the FO membranes or the RO membranes. Antiscalants may include condensed polyphosphates, organophosphonates, and polyelectrolytes. Dechlorination of the feed water may be achieved by the addition of sodium bisulfate. The pH of feed water and the draw may be raised to remove hardness and alkalinity or increase rejection of weakly ionized anions, such as borate, cyanide, fluoride, and certain arsenic and selenium compounds. The pH of feed water and the draw may be lowered to reduce scaling. Either the feed or the draw may have additional antiscalants, antifoulants, pH adjustments, degassing, in any combination and in any order, depending on the feed water, the operation parameters (e.g., recovery ratio), and the desired system permeate quality.

The scalant and foulant removal process of the draw stream, such as pH adjustments, may be completed in batch mode where the draw loop is drained and replaced with another draw solution while the scalant and foulant removal process is completed. The scalant and foulant removal process may also be completed in semi-batch mode, such that a small portion of the draw loop is removed for treatment at a time. The rejection and the scaling and fouling propensity of the forward osmosis membrane and the reverse osmosis membrane may be independently adjusted. The system may then be optimized to minimize consumables and maximize overall efficiency as desired for a specific application.

Unlike traditional reverse osmosis systems, the draw solution composition of the FO/RO systems shown in FIGS. 1 and 2 may be tuned to optimize the performance of the system. The draw solution may be any aqueous solution with high rejection from a reverse osmosis membrane. The draw solute may preferably be an inorganic salt such as sodium chloride, magnesium chloride, magnesium sulfate, sodium sulfate, or sodium phosphate. The draw solute may be monovalent or multivalent. The draw solution may be a mixture of salts, both monovalent or multivalent. The low rejection reverse osmosis membrane, such as those included in the LR modules, may be a standard reverse osmosis membrane for high sodium chloride rejection (e.g. greater than 99%), such as DOW SW30 membrane. The low rejection reverse osmosis membrane maybe a nanofiltration membrane, such as DOW NF90, with moderate sodium chloride rejection (greater than 80%) and high multivalent rejection (e.g. greater than 90%). The low rejection reverse osmosis membrane maybe a sulfonated polysulfone nanofiltration membrane, such as Hydranautics HydraCoRe70.

In both systems illustrated in FIGS. 1 and 2, the low rejection reverse osmosis membrane, which may be included in the LR modules, may be tuned by chemically treating a standard reverse osmosis membrane. In some examples, the low rejection reverse osmosis membrane may be a thin film composite membrane with a polyamide selective layer. The crosslinking density of the polyamide layer may be reduced, increasing salt passage (reducing selectivity) and increasing water permeability. For example, a DOW SW30 membrane may be exposed to 1000 ppm sodium hypochlorite solution for 10 minutes to 6 hours and then rinsed with sodium bisulfate or water. The sodium chloride rejection of the membrane may be reduced from 99% to 10%. The treated membrane may have high multivalent salt rejection. The draw solute composition of monovalent and multivalent salts and the reverse osmosis membrane may be chosen depending on the relative rejection of the membrane to monovalent salts and multivalent salts and the preferred operation parameters.

Figure 3:
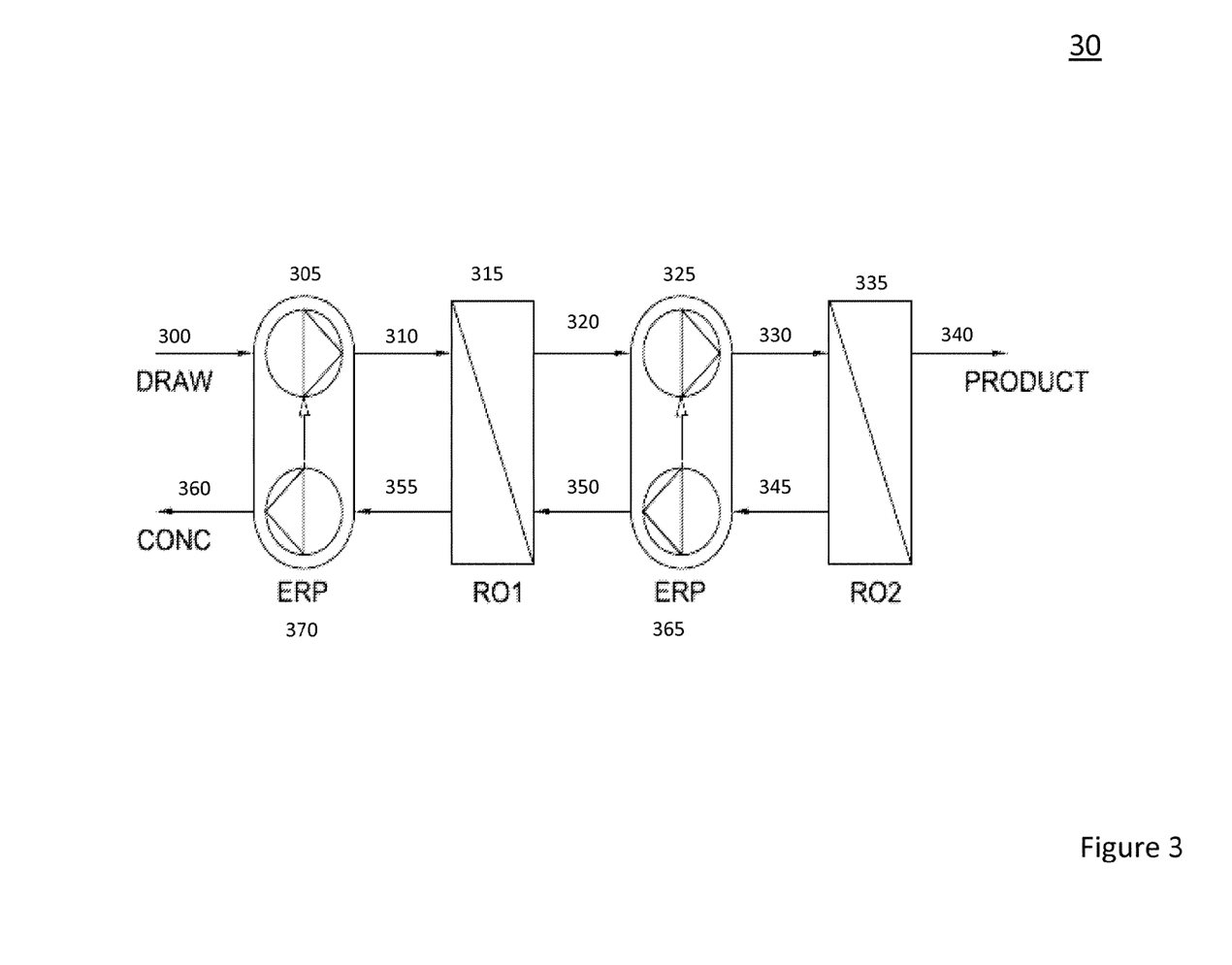
FIG. 3 is a block diagram of a purification system according to a further embodiment of the invention.

A multi-port purification system 30 according to the principles of the present invention is illustrated in FIG. 3. In this example, a draw solution 300 is brought to a first port 310 of a first RO element 315 by pump 305. A reject stream 355 from the first RO element 315 is depressurized and returned by energy recovery device 370 to the draw solution as a concentrated stream 360. The permeate 320 is pressurized by pump 325 and delivered to an input port 330 in a second RO element 335. Product leaves the RO element 335 as stream 340. A reject stream 345 is depressurized by an energy recovery device 365 and returned to a second port 350 in the first RO element 315.

In the example embodiment shown in FIG. 3, osmotic pre-treatment may be used with multiple RO stages and a 4-port RO element. The 4-port RO element may allow a saline solution to circulate through the permeate channel of RO1, which may decrease the effective osmotic pressure differential across the membrane RO1. Vessel RO2 may utilize a standard 3-port RO element. The concentration of the intermediate draw solution may be between the inlet draw solution concentration and the product water. In a two stage system, this concentration may be about half of the difference between the inlet draw solution and product water concentrations. In this example, the salinity difference across each RO element may be only about half of the total reduction in salinity from inlet to product.

The water recovery of this multi-stage RO system alone without FO pre-treatment is the product of water recoveries of each of the RO steps. For a system where water recovery of each of the RO steps is 10%, the overall system water recovery is only 1%. However, when an FO pre-treatment system is coupled to a multi-stage RO system, the overall recovery of the whole system is equal to the water recovery of the FO loop and independent of the water-recovery of the RO portion of the system, thus it can be greater than 1%.

From the foregoing it will be appreciated that, although specific embodiments of the invention have been described herein for purposes of illustration, various modifications may be made without deviating from the spirit and scope of the invention.

What is claimed is:

1. An apparatus, comprising:
   a forward osmosis module configured to receive a feed stream and a high concentration draw stream, wherein the forward osmosis module is further configured to produce a first stream comprising water from the feed stream and the high concentration draw stream via forward osmosis;
   a pump configured to pressurize the first stream;
   a low rejection membrane module configured to receive the pressurized first stream and to produce the high concentration draw stream and a low concentration stream via reverse osmosis, the low rejection membrane module having a low rejection membrane with a salt rejection rate of less than 90% at a first hydrostatic pressure; and
   a reverse osmosis module configured to receive at least a portion of the low concentration stream and to produce a product stream and a reverse osmosis reject stream, wherein the reverse osmosis module has a reverse osmosis membrane with a higher salt rejection than the low rejection membrane module at the first hydrostatic pressure;
   wherein the reverse osmosis reject stream is fluidly coupled to the high concentration draw stream prior to the forward osmosis module.

2. The apparatus of claim 1, further comprising a second pump configured to pressurize the low concentration stream provided to the reverse osmosis module.

3. The apparatus of claim 1, wherein the first stream is pressurized to less than 3000 psi.

4. The apparatus of claim 1, further comprising an energy recovery device configured to reduce the pressure of the high concentration draw stream produced by the low rejection membrane module.

5. The apparatus of claim 1, further comprising a feed pump configured to provide the feed stream to the forward osmosis module.

6. The apparatus of claim 1, wherein the reverse osmosis reject stream is combined with the pressurized first stream provided to the low rejection membrane module prior to the low rejection membrane module.

7. The apparatus of claim 1, wherein the low rejection membrane module has a salt rejection rate that is less than 80%.

8. The apparatus of claim 1, wherein the low rejection membrane module comprises a membrane with a salt rejection rate that is less than 80%.

9. The apparatus of claim 1, further comprising a dosing pump configured to provide a salt to the high concentration draw stream.

10. The apparatus of claim 9, wherein the salt comprises a multivalent salt.

11. The apparatus of claim 9, wherein the salt comprises a monovalent salt.

12. The apparatus of claim 1, wherein the low concentration stream is provided to an additional low rejection membrane module configured to produce a dilute stream and a rejection stream, wherein the additional low rejection membrane module is disposed between the low rejection membrane module and the reverse osmosis module, and wherein the reverse osmosis module is configured to receive the dilute stream containing a portion of the low concentration stream.

13. The apparatus of claim 12, wherein the reverse osmosis reject stream is combined with the pressurized first stream provided to the low rejection membrane module.

14. The apparatus of claim 12, wherein the reverse osmosis reject stream is combined with the low concentration stream provided to the additional low rejection module.

15. The apparatus of claim 12, further comprising a third pump configured to pressurize the dilute stream provided to the reverse osmosis module.

16. The apparatus of claim 1, wherein the low rejection membrane module is configured to be operated at the first hydrostatic pressure and the reverse osmosis membrane module is configured to be operated at the first hydrostatic pressure.

* * * * *